United States Patent [19]

Otani

[11] Patent Number: 4,481,454
[45] Date of Patent: Nov. 6, 1984

[54] METHOD OF DRIVING A STEPPING MOTOR

[75] Inventor: Yoshio Otani, Higashimatsuyama, Japan

[73] Assignee: Diesel Kiki Co., Ltd., Tokyo, Japan

[21] Appl. No.: 500,230

[22] Filed: Jun. 1, 1983

[30] Foreign Application Priority Data

Jun. 7, 1982 [JP] Japan .................................. 57-096232

[51] Int. Cl.³ ............................................ H02K 29/04
[52] U.S. Cl. ..................................... 318/696; 318/685
[58] Field of Search ................................ 318/696, 685

[56] References Cited

U.S. PATENT DOCUMENTS 4,339,702 7/1982 Araki et al. ......................... 318/696

FOREIGN PATENT DOCUMENTS 56-15189 2/1981 Japan .

Primary Examiner—Ulysses Weldon
Assistant Examiner—Saul M. Bergmann
Attorney, Agent, or Firm—Wenderoth, Lind & Ponack

[57] ABSTRACT

A stepping motor is rotated stepwise in angular increments by successively exciting a plurality of phases. When the stepping motor is to be stopped, the phase or phases which have been finally excited immediately prior to motor stop control are kept intermittently excited to stop the stepping motor. For starting the stepping motor again, the phase or phases being excited in the stop mode are supplied with continuous currents for an interval of time longer than the period of each single pulse applied to the phase or phases excited in the stop mode and shorter than the period in which a current flowing through the excited phase or phases become saturated, and thereafter the phases starting with a phase or phases following the phase or phases excited with the continuous currents are successively supplied with currents.

1 Claim, 2 Drawing Figures

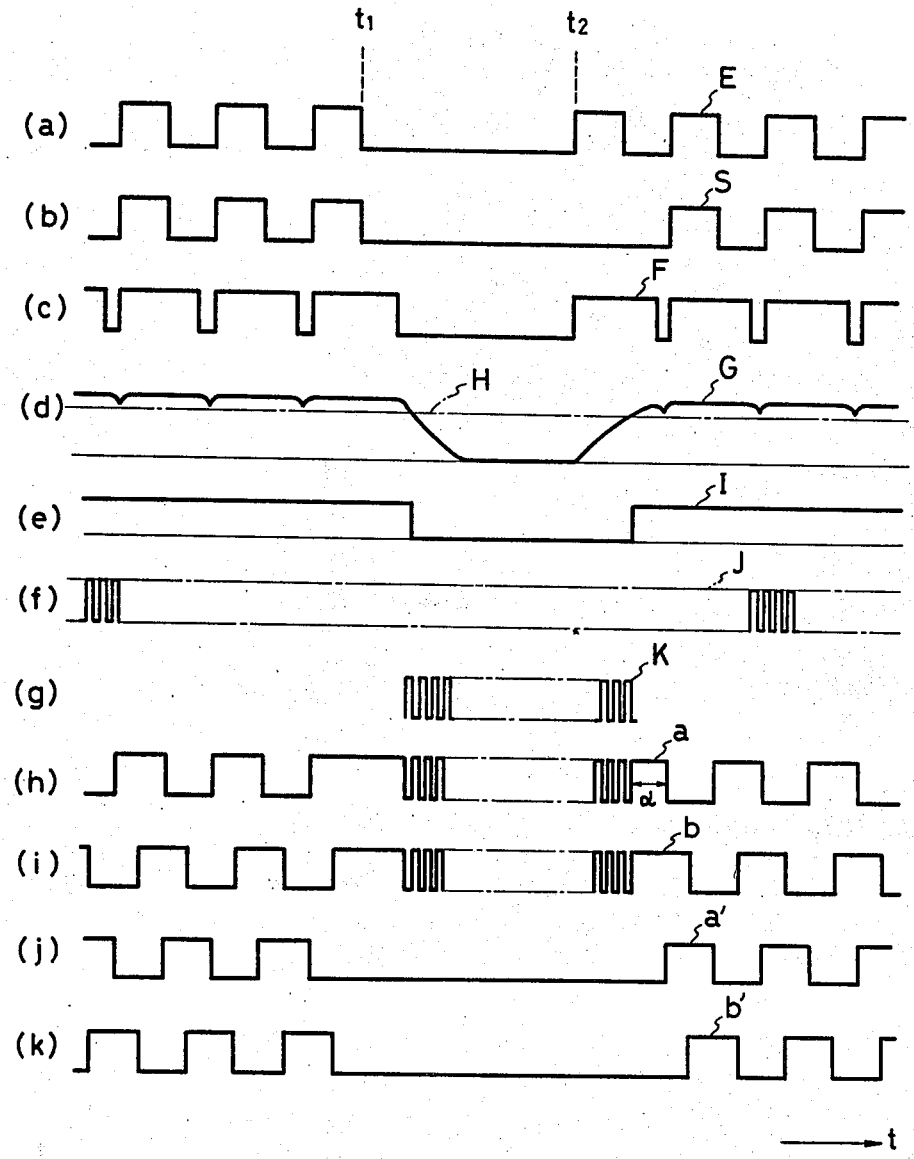

METHOD OF DRIVING A STEPPING MOTOR

BACKGROUND OF THE INVENTION

The present invention relates to a method of driving a stepping motor such as for use in mechanical positioning control, and more particularly to a method of driving a stepping motor in which excited phases are supplied with intermittent currents in the form of pulse signals while the motor is being stopped.

Stepping motors are driven by a known drive pulse generator circuit which is supplied with drive pulses to generate excitation signal pulses in the order in which the motor phase windings are to be excited, the excitation signal pulses being amplified and successively applied to the motor phases. The speed of rotation of the stepping motor is therefore dependent on the frequency of the drive pulses applied.

The rotation of the stepping motor is stopped when no drive pulses are fed to the motor. Upon stoppage of the supply of drive pulses, an excitation pulse generator circuit continues to excite a selected set of phases with the drive pulses impressed immediately before intermittent drive pulses are cut off.

Where the stepping motor is to be rotated at high speed with drive pulses having an increased frequency, it is customary to apply a voltage greater than a rated voltage to each phase of the motor for thereby improving motor characteristics during high-speed rotation. With such a practice, a voltage higher than a rated voltage is impressed on the windings of excited phases while the stepping motor is being held in a stopped position. When the motor is stopped for a long interval of time, excessive currents pass through the excited phases, resulting in the danger of burning out these windings. To solve this problem, Japanese Patent Laid-Open Publication No. 56-15189 discloses a stepping motor stop control system in which excited phases of a stepping motor are supplied with intermittent currents while the motor is being stopped, to thereby prevent the motor windings from being burned out.

When the stepping motor is started with drive pulses of a high frequency applied to the motor as it is stopped while the motor undergoes a load counteracting the motor rotation, the motor is liable to lose step and cannot start smooth rotation.

SUMMARY OF THE INVENTION

It is an object of the present invention to provide a method of driving a stepping motor, which is capable of starting the motor to rotate smoothly without losing steps when drive pulses of a high frequency are supplied to the motor as it is kept in a stopped position with intermittent currents applied to excited phases.

Another object of the present invention is to provide a method of driving a stepping motor while preventing motor windings from being burned out even with a voltage higher than a rated voltage being applied to the motor windings.

According to the present invention, a stepping motor having a plurality of phase windings from which a phase winding or phase windings can be selected for passing intermittent currents therethrough to stop rotation of the stepping motor, can be started again by passing continuous currents through the selected phase winding or windings for an interval of time longer than the duration of each of the intermittent currents and shorter than the period in which a current flowing through the phase winding or windings become saturated, while the stepping motor is being stopped in its rotation, and thereafter, passing currents successively through the phase windings starting with a phase winding or phase windings following the selected phase winding or windings.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a timing diagram illustrative of operation of the circuit arrangement shown in FIG. 1.

DESCRIPTION OF THE PREFERRED EMBODIMENT

Figure 1:
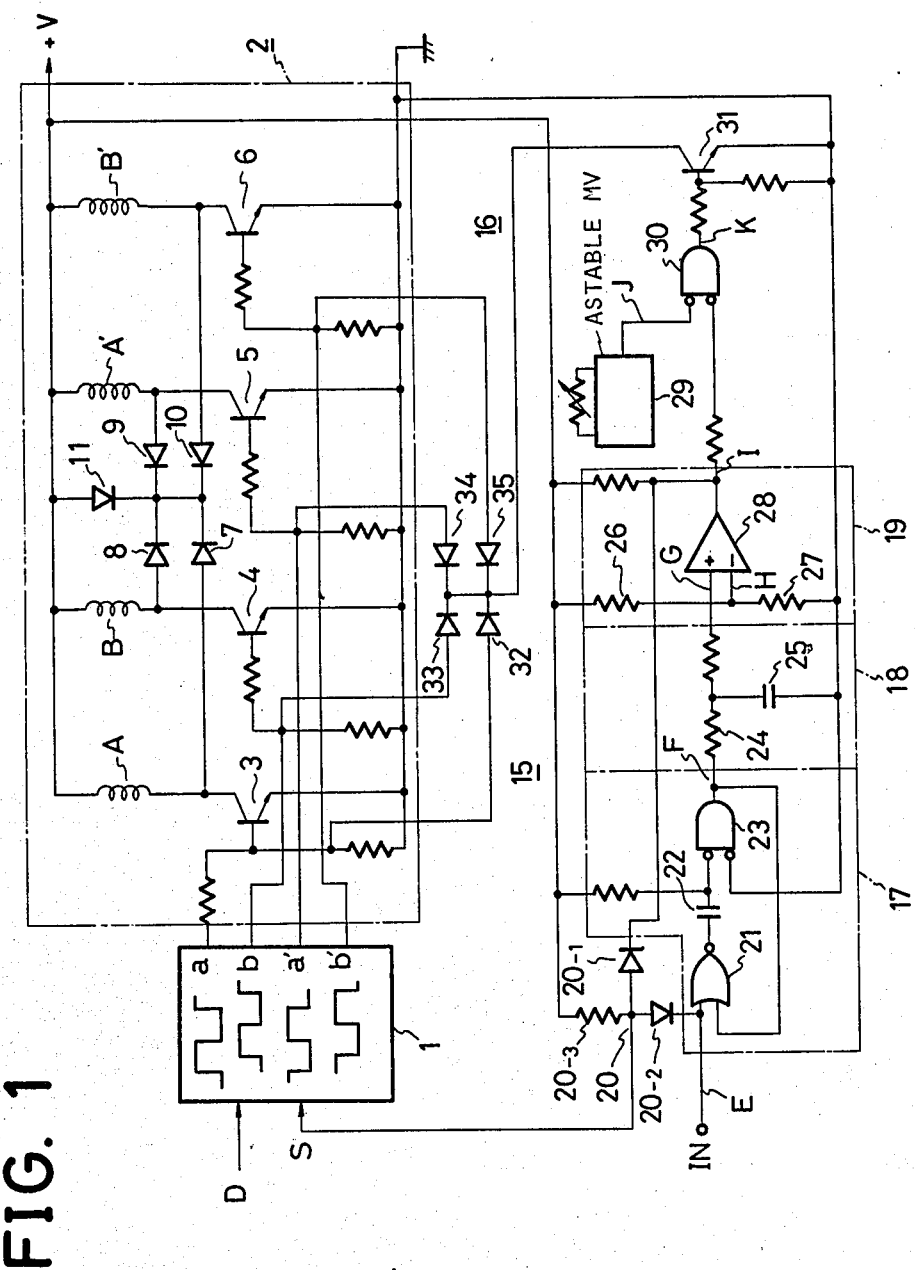
FIG. 1 is a circuit diagram, partly in block form, of a circuit arrangement in which a method of the present invention is carried out.

A method of driving a stepping motor according to the present invention will be described by way of example with reference to a stepping motor in which two out of four phases are excited at a time.

As shown in FIG. 1, a four-phase stepping motor has four phase windings A, B, A' and B'. An excitation pulse generator circuit 1, which is of a known arrangement, is responsive to a drive command signal S and a rotational direction signal D for generating excitation signal pulses a, b, a' and b' at prescribed timing for the stepping motor. In the illustrated embodiment, the excitation pulse generator circuit 1 impresses pulse voltages that are successively 90° out of phase on the phase windings while the drive command signal S is being applied to rotate the motor, the pulse voltages having the same frequencies. While the motor is commanded to stop its rotation by cutting off the drive command signal S, the excitation pulse generator circuit 1 continues to issue those excitation signal pulses which are produced at the time the motor has been commanded to stop the rotation.

The phase windings of the stepping motor are driven directly by a driver circuit 2 of a known construction comprising transistors 3, 4, 5 and 6 for amplifying the supplied excitation signal pulses a, b, a' and b', respectively, to energize the windings A, B, A' and B', respectively, diodes 7, 8, 9 and 10 having anodes connected respectively to the collectors of the transistors 3, 4, 5 and 6 for suppressing spike voltages produced across the windings A, B, A' and B' when the transistors 3, 4, 5 and 6 are turned off, and a zener diode 11 coupled between the cathodes of the diodes 7, 8, 9 and 10 and a power supply +V.

According to the illustrated embodiment, there are additionally provided a control circuit 15 for controlling the drive command signal S and a stop control circuit 16 for controlling the driver circuit 2 with an output from the control circuit 15 to stop the operation of the stepping motor.

The control circuit 15 is composed of a monostable multivibrator 17 triggerable by the leading or positive-going edges of drive pulses E supplied to an input terminal IN, an integrating circuit 18 for integrating an output voltage generated from the monostable multivibrator 17, a comparator 19 for comparing an output voltage from the integrating circuit 18 with a reference voltage and producing a high-potential output when the output voltage from the integrating circuit 18 exceeds the reference voltage, and an AND gate 20 comprising a diodes 20-1, 20-2 and a pull-up resistor 20-3 for receiving, as input signals, an output from the comparator 19 and the drive pulses E as applied to the input terminal IN and for producing the drive command signal S as an output. The monostable multivibrator 17 is comprised of a NOR gate 21, a differentiating circuit 22, and an AND gate 23. The integrating circuit 18 comprises a resistor 24 and a capacitor 25. The comparator 19 has a pair of resistors 26, 27 for generating a reference voltage by dividing the voltage from the power supply $+V$, and an operational amplifier 28 having an inverting input terminal supplied with the reference voltage produced by the resistors 26, 27 and a noninverting input terminal supplied with the output voltage from the integrating circuit 18.

The stop control circuit 16 is provided with an astable multivibrator 29, an AND gate 30, and a transistor 31. An output from the astable multivibrator 29 and the output voltage from the comparator 19 are supplied to the AND gate 30, which issues an output to drive the transistor 31. While the transistor 31 is being energized, the bases of the transistors 3, 4, 5 and 6 are grounded through diodes 33, 34, 35, and 36.

Operation of the circuit arrangement shown in FIG. 1 will be described with reference to FIG. 2 in which the stepping motor is controlled to stop its rotation at a time $t_1$ and to start its rotation at a time $t_2$.

Prior to the time $t_1$, the monostable multivibrator 17 is supplied with drive pulses E shown at (a) in FIG. 2 and triggered by the positive-going edges of the drive pulses E. The monostable multivibrator 17 produces output pulses each having a pulse duration slightly smaller than the period of the drive pulse E. The output from the monostable multivibrator 17 has a waveform indicated by F at (c) in FIG. 2. The output F from the monostable multivibrator 17 is integrated by the integrating circuit 18, which then produces an output G having a waveform shown at (d) in FIG. 2. A reference voltage H created by dividing the voltage of the power supply $+V$ with the resistors 26, 27 is of a level illustrated by H at (d) FIG. 2. Therefore, the comparator 19 issues an output I having a high potential as shown at (e) in FIG. 2. As long as the output I is of a high logic level, the output from the AND gate 20, that is, the drive command signal S, has substantially the same waveform as that of the drive pulses E as shown at (b) in FIG. 2, the drive command signal S being applied to the excitation pulse generator circuit 1.

While the output I of the comparator 19 is high in logic level, the AND gate 30 is disabled to inhibit the passage therethrough of an output J shown at (f) in FIG. 2 from the astable multivibrator 29. During this time, therefore, the transistor 31 remains de-energized.

The excitation pulse generator circuit 1 is enabled in response to the drive pulses E supplied for generating excitation pulses a, b, a' and b' which are sequentially 90° out of illustrated respectively at (h) through (k) in FIG. 2.

The excitation pulses a, b, a' and b' are separately amplified by the transistors 3, 4, 5 and 6 for energizing the phase windings A, B, A' and B', respectively, in 90° out-of-phase relationship. The stepping motor is then angularly moved in increments dependent on the frequency of the drive pulses E in a direction indicated by the rotational direction signal D applied to the excitation pulse generator circuit 1.

During rotation of the stepping motor, the supply of the drive pulses E is stopped at the time $t_1$, for example. When the drive pulses E are no longer supplied, the supply of the drive command signal S is also cut off, as shown at (b) in FIG. 2, after the time $t_1$ irrespective of the high level of the output I from the comparator 19. With the drive command signal S cut off, the excitation pulse generator circuit 1 maintains the output level of any pulses which are produced at the time the supply of the drive command signal S is turned off. In the illustrated embodiment, the excitation pulses a, b are of a high level, while the excitation pulses a', b' are of a low level when the drive command signal S is cut off.

When the drive pulses E have been cut off, no trigger pulse is applied to the monostable multivibrator 17. After the output pulse due to the final drive pulse E has been issued from the monostable multivibrator 17, the latter is not subsequently triggered as shown at (c) in FIG. 2. The integrating circuit 18 is then discharged to reduce its output G as shown at (d) in FIG. 2 at a rate dependent on its time constant. When the output voltage as it is reduced from the integrating circuit 18 becomes smaller than the reference voltage H, the output I from the comparator 19 goes low as illustrated at (e) in FIG. 2. The AND gate 30 is now opened to allow the output pulses J (as shown at (f) in FIG. 2) from the astable multivibrator 29 to pass as inverted therethrough. FIG. 2 shows at (g) the waveform of an output K from the AND gate 30.

The output K from the AND gate 30 repeatedly turns the transistor 31 on and off, which intermittently grounds the bases of the transistors 3-6 via the diodes 32-35, respectively, in each half period of the output pulse from the astable multivibrator 29. The phase windings A, B that are kept excited while the motor is being stopped are therefore intermittently excited as illustrated at (h) and (i) in FIG. 2.

The windings A, B, A' and B are usually supplied with currents greater than a rated current. However, there is no danger for these windings A, B, A' and B' to get burned out as such currents intermittently flow through the windings and hence their average currents are smaller than the rated currents.

Then, the drive pulses E are supplied again at the time $t_2$ to start rotating the stepping motor in angular increments. The drive pulses E are applied again to the input terminal IN at the time $t_2$ as shown at (a) in FIG. 2. The monostable multivibrator 17 is triggered as shown at (c) in FIG. 2 by the drive pulses E supplied from the time $t_2$ on. The output F from the monostable multivibrator 17 is integrated by the integrating circuit 18, which generates an output G that increases in level at a rate dependent on the time constant of the integrating circuit 18. When the output G exceeds the reference voltage H, the output I from the comparator 19 goes high as shown at (e) in FIG. 2, whereupon the AND gate 30 is closed to turn off the transistor 31. Consequently, the intermittent currents are no longer supplied to the windings A, B of the phases being excited during stoppage of the stepping motor, but, instead, continuous currents are supplied to the windings A, B, from the time the integrated output G becomes greater than the reference voltage H. With the output I from the comparator 19 being high, the diode 20-1 in the AND gate 20 is turned off. After the diode 20-1 has been turned off, the same pulse signal as the drive pulses E is supplied as the drive command signal S to the excitation pulse generator circuit 1.

The time constant of the integrating circuit 18 and the reference voltage H determined by the resistors 26, 27 are so selected that the period from the time when the output G from the integrating circuit G exceeds the reference voltage H to the positive-going edge of a second drive pulse E after the time $t_2$ is longer than an interval between any adjacent pulses of the output J from the astable multivibrator 29, that is, the duration of a single pulse which is applied to the excited phases while the motor is being stopped, and shorter than the period in which the currents flowing through the windings A, B of the excited phases become saturated.

As shown in FIG. 2 at (h) and (i), therefore, the excited phase windings A, B are supplied with continuous currents for the period of time $\alpha$ which is greater than an interval between any adjacent pulses of the output J from the astable multivibrator 29 and shorter than the period in which the currents flowing through the windings A, B of the excited phases become saturated.

When the drive command signal S as shown at (b) in FIG. 2 is supplied to the excitation pulse generator circuit 1, the latter successively issues the excitation pulses b and a', a' and b', b' and a, ... that are mutually 90° out of phase to the windings B and A', A' and B', B' and A, ..., respectively, in the order named. The stepping motor now starts being angularly moved in increments again.

Immediately before the stepping motor thus starts rotating, the windings A, B of the phases excited during motor stoppage are supplied with continuous currents for the period $\alpha$, which are greater than the intermittent currents that have been passed through the windings A, B in the motor stop mode. The starting torque of the stepping motor, as it is rotated from the stop mode by abruptly applying the high-frequency drive command signal S, is greater than that available in the stop mode due to the larger currents flowing through the phases than that available in the stop mode. During the period $\alpha$, excessive currents flow through the windings of the phases being excited while the stepping motor is being stopped, so that the stepping motor can start its rotation with a large starting torque. Even when the stepping motor undergoes a load counteracting its rotation, therefore, the stepping motor can start rotating smoothly without losing steps.

The windings are prevented from being burned out during the motor stop mode since no overcurrents flow through the windings throughout the motor stop mode, but continuous currents are passed through the windings only for a predetermined interval of time before the motor is started again after the motor has been kept in the stop mode.

The reason for the period $\alpha$ being shorter than the interval in which the currents flowing through the windings become saturated is that any additional currents supplied after the currents flowing through the windings have been saturated would not contribute to any increase in the starting torque, but tend to excessively heat the windings through which such additional currents would flow. The period $\alpha$ is longer than the interval between any adjacent pulses from the astable multivibrator 29 because if the period $\alpha$ were shorter than the inter-pulse period of the output K, then the currents flowing during the period $\alpha$ would become smaller than the average currents flowing through the windings in the motor stop mode, and hence would not result in any increase in the starting torque.

While in the illustrated embodiment two out of four phases of the four-phase stepping motor are excited at a time, the present invention is also applicable to four-phase stepping motors in which phases are excited in various combinations such as one-phase-at-a-time excitation or alternate one-phase/two-phase excitation, and to other stepping motors having more or fewer phases than four phases.

With the arrangement of the present invention, when a stepping motor is to be started again from a stop mode, currents greater than average currents flowing through the phase or phases being excited while the stepping motor is being stopped are passed through the excited-phase windings for a predetermined interval of time, and then the windings of successive phases starting with a phase or phases following the excited phase or phases are sequentially supplied with pulses. Therefore, the motor starting torque is increased to start the motor smoothly without the risk of the motor losing steps. Since the maximum period in which the continuous currents are passed through the windings of phases being excited is the interval in which the currents flowing through these windings are saturated, there is no danger for the windings to become burned out.

Although a certain preferred embodiment has been shown and described, it should be understood that many changes and modifications may be made therein without departing from the scope of the appended claims.

What is claimed is:

1. A method of driving a stepping motor having a plurality of phase windings from which one or more phase windings can be selected for passing intermittent currents therethrough to stop rotation of the stepping motor while exciting said selected phase winding or windings, said method comprising the steps of:
    (a) passing continuous currents through said selected phase winding or windings for an interval of time longer than the duration of each of said intermittent currents and shorter than the period in which a current flowing through said phase winding or windings become saturated, while the stepping motor is being stopped in its rotation, and
    (b) thereafter, passing currents successively through said plurality of phase windings starting with a phase winding or phase windings following said selected phase winding or windings.

* * * * *